J. Luther,
Casting Screws.
Nº 2,146.    Patented June 26, 1841.

UNITED STATES PATENT OFFICE.

JOHN LUTHER, OF WARREN, RHODE ISLAND.

IMPROVEMENT IN METALLIC SCREWS.

Specification forming part of Letters Patent No. 2,146, dated June 26, 1841.

*To all whom it may concern:*

Be it known that I, JOHN LUTHER, of Warren, in the county of Bristol and State of Rhode Island, have invented a new and useful Improvement in casting composition screws with brass, copper, iron, or other hard metallic heads, with tin, lead, zinc, antimony, or other soft metallic bodies combined, which is described as follows, reference being had to the annexed drawings of the same, making part of this specification.

Figure 1:
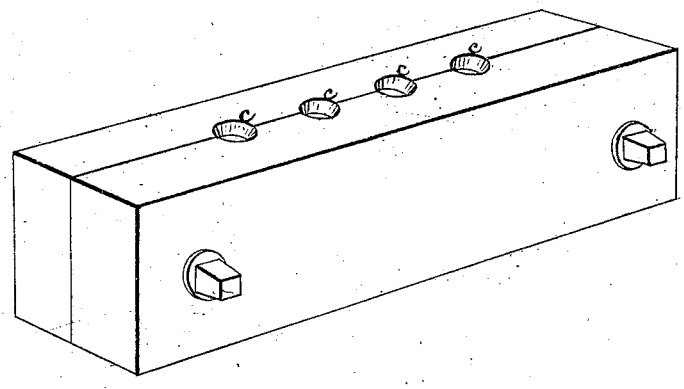
Figure 2:
Figure 3:
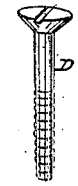

Figure 1 is the mold ready to be filled; Fig. 2, a head and shank, and Fig. 3 a screw finished.

For screws with brass heads I prepare the pieces of metal intended to form the heads of the screws with shanks, by casting or hammering them to a proper shape from the metal. A, Fig. 2, represents one of them. I then prepare a composition or amalgam of tin, lead, zinc, and antimony by melting these metals together in the kettle, and, when in a liquid state, with a ladle pouring it into the molds (previously heated) until they are all nearly filled. I next introduce a shank, A, of a head, B, (previously tinned to cause the composition to adhere,) into the center of each mold c, which shank will of course displace as much of the liquid as the size of the part of the shank immersed, and cause the composition to rise around the shank until it reaches its head or the surface of the molds.

The molds c are made in the usual manner of making molds for casting small articles, and of any convenient size for casting any required number of screws at a single pouring of the composition. When the composition metal has cooled sufficiently to become solid, I apply the molds with the heads to a revolving burr of a common turning-lathe which will polish the heads, and then to a revolving circular saw which will cut the grooves for the screw-driver. I then open the molds and find a set of strong and perfectly-formed screws—such as that represented at D, Fig. 3. The process is the same in making screws with copper, zinc, iron, or other metallic heads, except that these metals are to be substituted for brass in the operation of casting.

Any one of the above-named metals will answer singly, or two of them, and will adhere to the center pin or shank of the head, provided it be previously tinned for that purpose.

What I claim as my invention, and which I desire to secure by Letters Patent, is—

Making cast screws with iron, brass, or copper heads and shanks, while the body and thread are made of tin, lead, zinc, antimony, or any soft metal, or any of these combined.

JOHN LUTHER.

Witnesses:
 ALFRED BOSWORTH,
 AMASA MASON.